United States Patent
Coss, Jr. et al.

(10) Patent No.: US 6,446,022 B1
(45) Date of Patent: Sep. 3, 2002

(54) WAFER FABRICATION SYSTEM PROVIDING MEASUREMENT DATA SCREENING

(75) Inventors: Elfido Coss, Jr.; Brian K. Cusson; Mike Simpson, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/252,402

(22) Filed: Feb. 18, 1999

(51) Int. Cl.$^7$ .................. G01N 37/00; G06F 19/00; G01L 15/00; G01M 19/00
(52) U.S. Cl. .................. 702/121; 702/84; 700/109
(58) Field of Search .................. 702/121, 84, 182; 700/108, 109, 117, 121

(56) References Cited

U.S. PATENT DOCUMENTS

| | | | |
|---|---|---|---|
| 5,432,702 A | | 7/1995 | Barnett |
| 5,761,064 A | * | 6/1998 | La et al. ............. 364/468.17 |
| 5,859,964 A | * | 1/1999 | Wang et al. ........... 395/185.01 |
| 5,862,054 A | * | 1/1999 | Li ..................... 364/468.28 |
| 5,886,896 A | * | 3/1999 | Lantz et al. ........... 364/468.23 |
| 6,027,022 A | * | 2/2000 | Hong ................... 235/462.01 |
| 6,035,293 A | * | 3/2000 | Lantz et al. ........... 707/1 |
| 6,090,632 A | * | 7/2000 | Jeon et al. ............ 438/14 |
| 6,112,130 A | * | 8/2000 | Fukuda et al. ......... 700/121 |
| 6,128,403 A | * | 10/2000 | Ozaki ................. 382/145 |
| 6,128,588 A | * | 10/2000 | Chacon ................ 703/6 |
| 6,163,761 A | * | 12/2000 | Kent .................. 702/187 |
| 6,185,324 B1 | * | 2/2001 | Ishihara et al. ........ 382/149 |
| 6,256,550 B1 | * | 7/2001 | Wu et al. ............. 700/121 |
| 6,263,255 B1 | * | 7/2001 | Tan et al. ............ 700/121 |

* cited by examiner

Primary Examiner—Patrick Assouad
(74) Attorney, Agent, or Firm—Kevin L. Daffer; Conley, Rose & Tayon P.C.

(57) ABSTRACT

A wafer fabrication system is presented including a measurement system which screens measurement data prior to dissemination. The measurement system may include an equipment interface computer coupled between a measurement tool and a work-in-process (WIP) server. The measurement tool may perform one of possibly several measurement procedures (i.e., "recipes") upon one or more semiconductor wafers processed as a lot, thereby producing measurement data. The WIP server may select the measurement recipe and store the measurement data. The equipment interface computer may receive the measurement data produced by the measurement tool and compare the measurement data to a predetermined range of acceptable values in order to determine if the measurement data is within the range of acceptable values. The equipment interface computer may display the measurement data upon a display device such that any portion of the measurement data not within the range of acceptable values is visually flagged (e.g., displayed in flashing type, in bold type, in a color which differs from surrounding text, with a background color which differs from surrounding text, etc.). The equipment interface computer may allow an operator to modify the measurement data, then generate a signal indicating acceptance of the measurement data. Upon receiving the signal indicating acceptance, the equipment interface computer may provide the measurement data to the WIP server. The equipment interface computer may also respond to the acceptance signal by providing the measurement data to an entity server and/or a statistical process control (SPC) server.

19 Claims, 6 Drawing Sheets

WAFER FABRICATION SYSTEM PROVIDING MEASUREMENT DATA SCREENING

BACKGROUND OF THE INVENTION

1. Field of the Invention

This invention relates to the manufacture of integrated circuits, and more particularly to wafer fabrication systems including measurement systems for measuring characteristics of integrated circuit structures.

2. Description of Related Art

Integrated circuits are typically formed by processing one or more semiconductor wafers as a "lot" through a series of wafer fabrication tools. Each wafer fabrication tool typically performs a single wafer fabrication operation upon the semiconductor wafers of the lot. For example, a given tool may perform a layering operation, a patterning operation, a doping operation, or a heat treatment upon the semiconductor wafers. A layering operation may add a layer of a desired material to an exposed surface of the semiconductor wafers. Common layering operations include thermal oxidation, chemical vapor deposition (CVD), evaporation, and sputtering. A patterning operation may contribute to the removal of selected portions of one or more layers formed by layering. A doping operation may place dopant atoms upon and within exposed surfaces of the semiconductor wafers, thereby producing the p-n junctions required for semiconductor operation. A heat treatment may heat the one or more semiconductor wafers to achieve specific results (e.g., dopant drive-in or annealing).

Each wafer fabrication tool typically performs a wafer fabrication operation according to a predefined procedure (i.e., a predetermined set of steps or "recipe"). For example, a given CVD wafer fabrication tool may carry out a layering operation within a chamber according to a recipe which specifies temperatures and pressures within the chamber as a function of time, as well as the types and flow rates of gases introduced into the chamber.

Characteristics of key integrated-circuit structures formed by wafer fabrication operations (e.g., gate oxide thicknesses) are typically measured to ensure the characteristics remain within acceptable ranges. In order to detect manufacturing problems as quickly as possible, such measurements are typically performed immediately following structure formations. Special test structures may be formed on test wafers processed along with "product" wafers, or within test areas of product wafers, and the characteristics of the special test structures may be measured. Alternately, the characteristics of operational circuit structures formed upon product wafers may be measured. One common technique for tracking and analyzing manufacturing process variation is called statistical process control (SPC). SPC is typically used to gauge the stability of a manufacturing process over time via control charts which document historical process performance.

Figure 1:
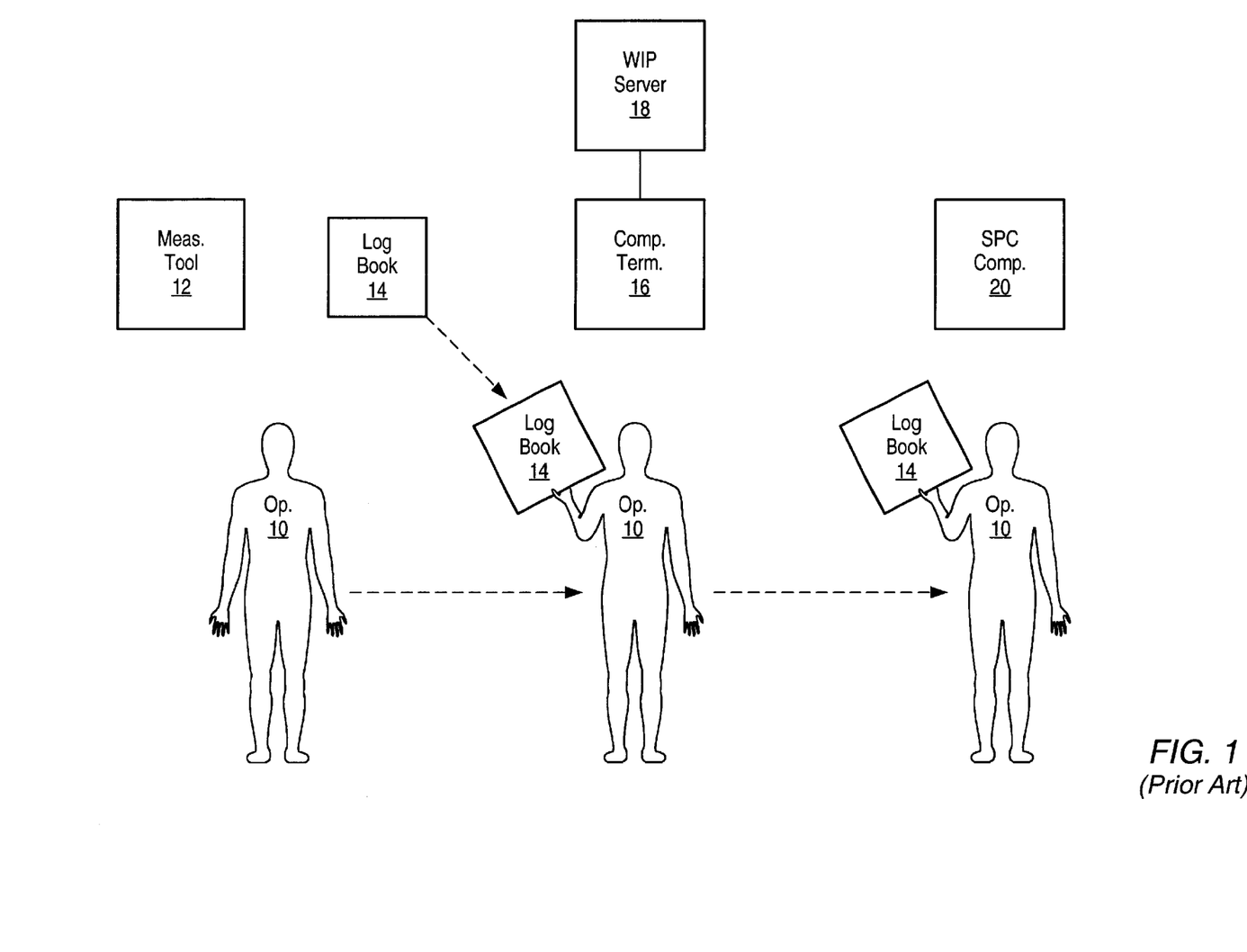
FIG. 1 is a diagram illustrating a current method for obtaining and documenting measurement data within a wafer fabrication facility.

FIG. 1 is a diagram illustrating a current method for obtaining and documenting measurement data within a wafer fabrication facility. In a first step, an operator 10 submits the one or more wafers of the lot to a measurement tool 12 and selects a measurement recipe stored within measurement tool 12. Measurement tool 12 performs at least one measurement upon the wafers of the lot according to the selected recipe and displays the resulting measurement data upon a display screen (not shown). Operator 10 then manually enters the displayed measurement data into a log book 14.

In a second step, operator 10 carries log book 14 to a computer terminal 16 connected to a work-in-process (WIP) server 18. WIP server 18 tracks lots, schedules wafer processing operations, and stores measurement data. Operator 10 manually enters the measurement data via a keyboard of computer terminal 16, and computer terminal 16 transfers the measurement data to WIP server 18.

In a third step, operator 10 carries log book 14 to a stand-alone SPC computer 20. SPC computer 20 performs statistical operations upon input measurement data and plots the resulting statistical data on one or more control charts. Operator 10 manually enters the measurement data via a keyboard of SPC computer 20 and views the control charts to ensure the plotted statistical data lies within acceptable ranges.

The current method for obtaining and documenting measurement data described above is time consuming and error prone. Operator 10 may submit an incorrect lot to measurement tool 12, resulting in erroneous measurement data. Operator 10 may select an incorrect measurement recipe, again resulting in erroneous measurement data. Operator 10 may make an error when manually entering the measurement data into log book 14, similarly resulting in erroneous measurement data. Operator 10 must physically carry log book 14 to computer terminal 16 and to SPC computer 20. Operator 10 may make an error when manually entering the measurement data via the keyboard of computer terminal 16 or SPC computer 20, again resulting in erroneous measurement data. It would thus be desirable to have an automated method for obtaining and documenting measurement data within a wafer fabrication facility.

SUMMARY OF THE INVENTION

The problems outlined above are in large part solved by a wafer fabrication system including a measurement system which screens measurement data prior to dissemination. The measurement system may include an equipment interface computer coupled between a measurement tool and a work-in-process (WIP) server. The measurement tool may perform one of possibly several measurement procedures (i.e., "recipes") upon one or more semiconductor wafers processed as a lot, thereby producing measurement data. The WIP server may select the measurement recipe and store the measurement data. The equipment interface computer may receive the measurement data produced by the measurement tool and compare the measurement data to a predetermined range of acceptable values in order to determine if the measurement data is within the range of acceptable values. The equipment interface computer may display the measurement data upon a display device such that any portion of the measurement data not within the range of acceptable values is visually flagged (e.g., displayed in flashing type, in bold type, in a color which differs from surrounding text, with a background color which differs from surrounding text, etc.). The equipment interface computer may allow an operator to modify at least the portion of the measurement data not within the range of acceptable values, then generate a signal indicating acceptance of the measurement data. Upon receiving the signal indicating acceptance, the equipment interface computer may provide the measurement data to the WIP server. The equipment interface computer may also respond to the acceptance signal by providing the measurement data to an entity server and/or a statistical process control (SPC) server.

The measurement system may also include a switch coupled between the measurement tool and the equipment interface computer. In a first position, the switch may couple the display device and a keyboard to the equipment interface computer. In a second position, the switch may couple the display device and the keyboard to the measurement tool. When the switch is in the first position, the equipment interface computer may receive substitute measurement data and the signal indicating acceptance from the keyboard. The equipment interface computer may replace the measurement data produced by the measurement tool with the substitute measurement data received from the keyboard.

The substitute measurement data may be generated by causing the measurement tool to repeat the measurement recipe or to perform a different measurement recipe. The operator may generate substitute data by placing the switch in the second position and entering measurement recipe selection information via the keyboard. The measurement tool may respond to the measurement recipe selection information by performing the specified measurement recipe upon one or more of the semiconductor wafers of the lot and providing the resulting (i.e., substitute) measurement data to the display device via the switch. The operator may then place the switch in the first position and enter the substitute measurement data via the keyboard. With the switch in the first position, the equipment interface computer may receive the substitute measurement data from the keyboard and replace the original measurement data with the substitute measurement data.

When the operator is ready to accept the measurement data as displayed upon the display device, the operator may press one or more predetermined keys of the keyboard. The pressing of the one or more predetermined keys may result in a signal indicating acceptance of the measurement data. The equipment interface computer may receive the signal indicating acceptance via the switch and respond by providing the measurement data as described above.

The measurement system may also include a keyboard interface coupled between the keyboard and the switch, and a bar code reader coupled to the keyboard interface. The keyboard interface may couple both the keyboard and the bar code reader to the switch. The bar code reader may be used to identify the wafer lot via an alphanumeric code printed in a bar code format upon a "run" card which accompanies the lot. The bar code reader may read the bar code thereby producing bar code information. When the switch is in the first position, the equipment interface computer may receive the bar code information via the keyboard interface and the switch. The equipment interface computer may provide the bar code information to the WIP server, and the WIP server may respond to the bar code information by providing lot information and measurement recipe selection information to the equipment interface computer. The equipment interface computer may provide the measurement recipe selection information to the measurement tool. The measurement tool may respond to the measurement recipe selection information by performing the measurement recipe upon one or more semiconductor wafers of the lot.

The wafer fabrication system may also include a process tool coupled to a workstation controller. The process tool may perform a wafer fabrication process (e.g., a layering operation, a patterning operation, a doping operation, or a heat treatment) upon the one or more semiconductor wafers of the lot. The process tool may operate in response to control signals received from the workstation controller. The workstation controller, equipment interface computer, and WIP server may be connected to a common transmission medium (e.g., a twisted-pair cable, a coaxial cable, etc.). In addition to storing measurement data, the WIP server may schedule the process performed by the process tool.

A method for screening measurement data in accordance with the present invention includes receiving the measurement data and determining if the measurement data is within a range of acceptable values. A portion of the measurement data not within the range of acceptable values is flagged, and at least the flagged portion of the measurement data is made accessible for modification. The measurement data is provided to a data storage device only after a signal indicating acceptance of the measurement data is received. As a result, out-of-range measurement data is prevented from being provided to the data storage device without review and acceptance.

BRIEF DESCRIPTION OF THE DRAWINGS

Other objects and advantages of the invention will become apparent upon reading the following detailed description and upon reference to the accompanying drawings. in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
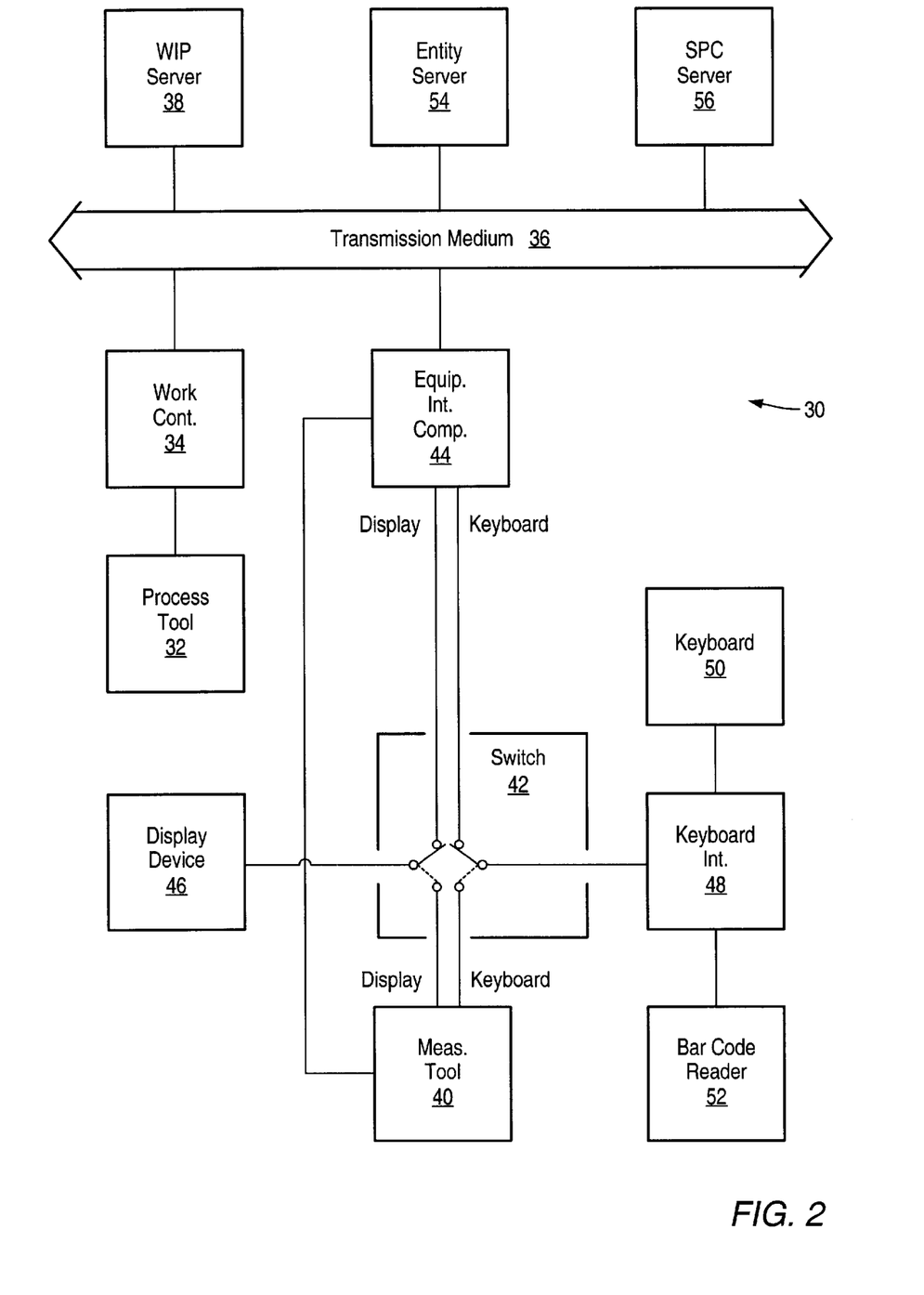
FIG. 2 is a block diagram of a wafer fabrication system in accordance with one embodiment of the present invention, wherein the wafer fabrication system includes a measurement system which screens measurement data prior to dissemination.

FIG. 2 is a block diagram of a wafer fabrication system 30 in accordance with one embodiment of the present invention. Wafer fabrication system 30 includes a process tool 32 coupled to a workstation controller 34. Process tool 32 performs a wafer fabrication process (e.g., a layering operation, a patterning operation, a doping operation, or a heat treatment) upon one or more semiconductor wafers, processed as a lot, in response to control signals received from workstation controller 34. Process tool 32 may be, for example, a thermal oxidation tool, a CVD tool, a thermal diffusion chamber, an ion implantation device, or an etch tool.

Workstation controller 34 may be, for example, a microprocessor-based computer system such as a personal computer. Workstation controller 34 is coupled to a transmission medium 36 (e.g., a twisted-pair cable, a coaxial cable, etc.). Workstation controller 34 receives control signals from a work-in-process (WIP) server 38 also coupled to transmission medium 36. WIP server 38 schedules the wafer fabrication process performed by process tool 32, generates control signals, and transmits the control signals to process tools 32 via transmission medium 36 and workstation controller 34. WIP server 38 also stores measurement data associated with the one or more semiconductor wafers of the lot. WIP server 38 may be, for example, a mainframe computer such as a VAX 1170.

Wafer fabrication system 30 also includes a measurement tool 40 coupled to transmission medium 36 via a switch 42 and an equipment interface computer 44. Measurement tool 40 performs a selected measurement procedure (i.e. "recipe") upon one or more of the semiconductor wafers processed as a lot, thereby producing measurement data. Measurement tool 40 may be, for example, an ellipsometer made by PLASMOS GmbH (Munich, Germany). Measurement tool 40 may store multiple measurement recipes. Equipment interface computer 44 may be, for example, a microprocessor-based computer system such as a personal computer. Equipment interface computer 44 may communicate with measurement tool 40 using, for example, a semiconductor equipment communication standard (SECS) interface and protocol such as SECS-2.

Switch 42 is coupled between measurement tool 40 and equipment interface computer 44, and is also coupled to a display device 46 and a keyboard interface 48. Display device 46 may be, for example, a computer monitor. Keyboard interface 48 is coupled to a keyboard 50 and a bar code reader 52. Keyboard 50 may be, for example, a computer keyboard. Switch 42 selectively couples display device 46 and keyboard interface 48 to either measurement tool 40 or equipment interface computer 44. A suitable switch 42 is the A/B switch made by Data Transfer Switch (Houston, Tex.).

Keyboard interface 48 receives signals produced by keyboard 50 and provides the signals to switch 42. Keyboard interface 48 also receives signals produced by bar code reader 52, formats the signals to mimic those produced by keyboard 50, and provides the formatted signals to switch 42. Keyboard interface 48 thus couples the signals produced by both keyboard 50 and bar code reader 52 to switch 42. Keyboard interface 48 is commonly preferred to as a keyboard "wedge". A suitable bar code reader is the SCANTEAM® 5400 hand held laser scanner made by Welch Allyn (New York, N.Y.). The SCANTEAM® 5400 hand held laser scanner is available with an Instant Interface Module which provides keyboard wedge functions. Another suitable keyboard wedge is the SCANTEAM®2000 made by Welch Allyn (New York, N.Y.).

A unique alphanumeric code may be assigned to each semiconductor wafer lot undergoing wafer fabrication. The alphanumeric code may be printed in a bar code format upon a "run" card which accompanies the semiconductor wafer lot. One or more integrated circuits may be formed upon wafers of the semiconductor wafer lot by performing a series of semiconductor wafer processes in a predetermined order. In order to monitor the quality and effectiveness of the wafer fabrication process, characteristics of key integrated circuit structures may be measured following the wafer fabrication operations which form the structures.

In order to perform a measurement upon one or more wafers of a wafer lot, an operator may place the run card associated with the wafer lot in close proximity to bar code reader 52 such that bar code reader 52 reads the bar code printed on the run card. Bar code reader 52 may produce bar code information signals which identify the semiconductor wafer lot. Keyboard interface 48 may format the bar code information signals in the manner of keyboard 50 and provide the formatted bar code information signals to switch 42.

In a first position, switch 42 couples keyboard interface 48 to equipment interface computer 44. As a result, switch 42 couples the formatted bar code information signals produced by keyboard interface 48 to equipment interface computer 44. Equipment interface computer 44 transmits the bar code information to WIP server 38 via transmission medium 36. WIP server 38 responds to the bar code information by providing lot information and measurement recipe selection information to equipment interface computer 44 via transmission medium 36. The measurement recipe selection information specifies the measurement recipe to be performed by measurement tool 40 upon one or more of the semiconductor wafers of the lot. Equipment interface computer 44 provides the measurement recipe selection information to measurement tool 40. Measurement tool 40 responds to the measurement recipe selection information by performing the selected measurement recipe upon the one or more of the semiconductor wafers of the lot and providing the measurement data to equipment interface computer 44.

Equipment interface computer 44 receives the measurement data from measurement tool 40 and compares the measurement data to a stored range of acceptable values in order to determine if the measurement data is within the range of acceptable values. In the first position, switch 42 couples display device 46 to equipment interface computer 44. Equipment interface computer 44 provides the lot information and the measurement data to display device 46 via switch 42 such that any portion of the measurement data not within the range of acceptable values is visually flagged (e.g., displayed in flashing type, in bold type, in a color which differs from surrounding text, with a background color which differs from surrounding text, etc.).

As describe above, switch 42 couples keyboard interface 48 to equipment interface computer 44 in the first position. The operator may modify a selected portion of the measurement data displayed upon display device 46 by entering substitute measurement data via keyboard 50. Equipment interface computer 44 receives such substitute measurement data via switch 42 and replaces the measurement data produced by measurement tool 40 with the substitute measurement data.

The substitute measurement data may be generated by causing measurement tool 40 to repeat the measurement recipe or to perform a different measurement recipe. In a second position, switch 42 couples display device 46 and keyboard interface 48 to measurement tool 40. The operator may generate substitute data by placing switch. 42 in the second position and entering measurement recipe selection information via keyboard 50. Measurement tool 40 may respond to the measurement recipe selection information by performing the specified measurement recipe upon one or more of the semiconductor wafers of the lot and providing the resulting (i.e., substitute) measurement data to display device 46 via switch 42. The operator may then place switch 42 in the first position and enter the substitute measurement data via keyboard 50. With switch 42 in the first position, equipment interface computer 44 receives the substitute measurement data from keyboard 50 and replaces the measurement data produced by measurement tool 40 with the substitute measurement data.

When the operator is ready to accept the measurement data as displayed upon display device 46, the operator presses one or more predetermined keys of keyboard 50. The pressing of the one or more predetermined keys results in a signal indicating acceptance of the measurement data. Equipment interface computer 44 receives the signal indicating acceptance via switch 42 and responds by transmitting the measurement data to WIP server 38 via transmission medium 36.

Wafer fabrication system 30 also includes an entity server 54 and an SPC server 56 coupled to transmission medium 36. Entity server 54 stores measurement data in a historical database. SPC server 56 performs statistical operations upon received measurement data. SPC computer 56 may plot the resulting statistical data on one or more control charts. Equipment interface computer 44 may also respond to the signal indicating acceptance by formatting the measurement data in a predetermined manner and transmitting the measurement data to entity server 54 and SPC server 56 via transmission medium 36. It is noted that equipment interface computer 44 may also respond to the signal indicating acceptance by formatting the measurement data as required and transmitting the measurement data to other devices coupled to transmission medium 36.

As described above, process tool 32 performs a selected process procedure (i.e. "recipe") upon one or more of the semiconductor wafers processed as a lot. WIP server 38 may, for example, provide process recipe selection information to workstation controller 34 via transmission medium 36. The process recipe may be stored within process tool 32. In this case, workstation controller 34 may provide the process recipe selection information to process tool 32. Process tool 32 may respond to the process recipe selection information by performing the process recipe upon one or more semiconductor wafers of the lot. Alternately, the process recipe may be stored within workstation controller 34. In this case, workstation controller 34 may respond to the process recipe selection information by providing the process recipe to process tool 32. Process tool 32 may respond to the process recipe by performing the process recipe upon one or more semiconductor wafers of the lot.

Figure 3A:
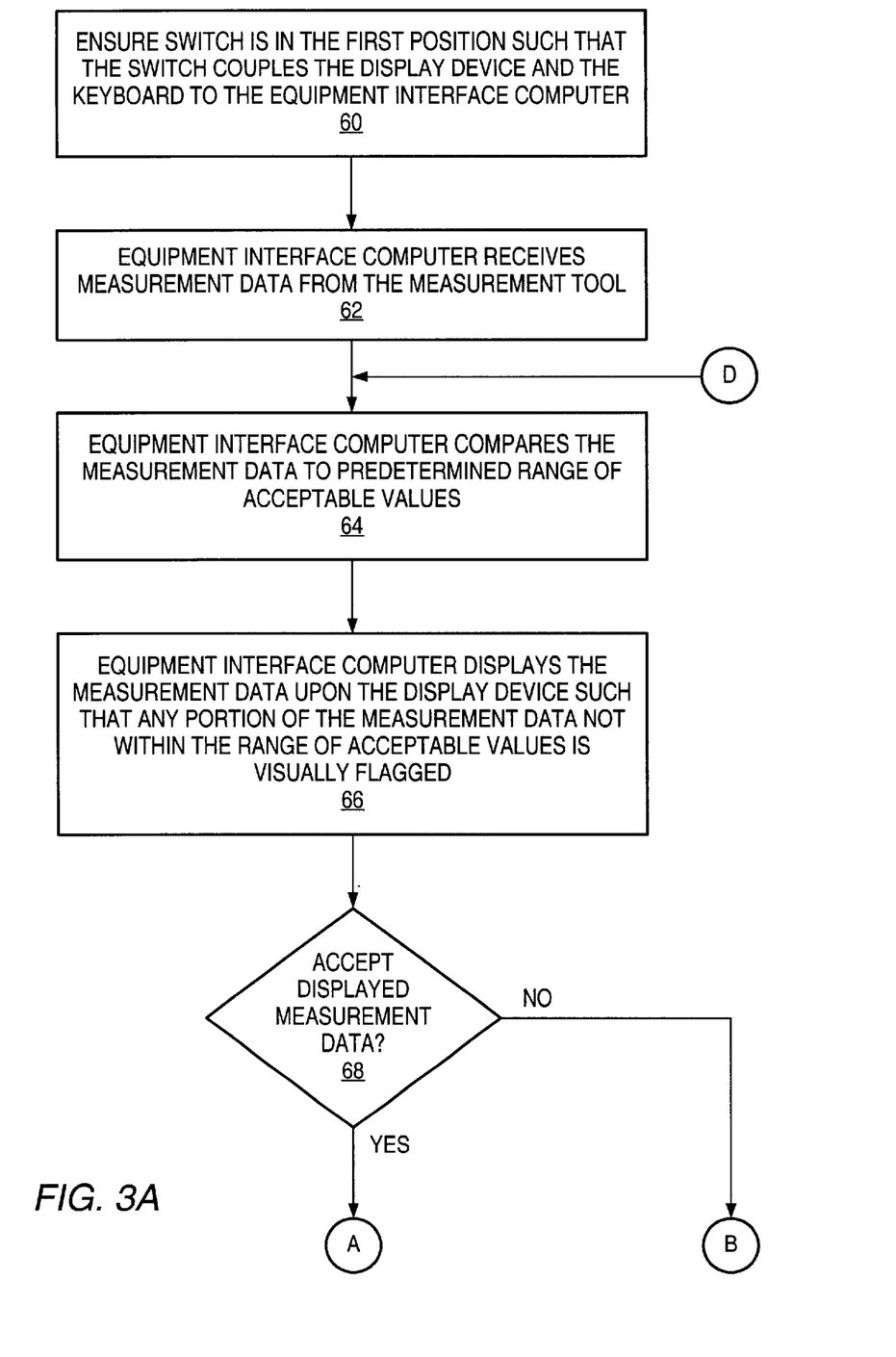
FIGS. 3a–c form a flow chart illustrating an exemplary data collection and dissemination method embodied within the wafer fabrication system of FIG. 2.
Figure 3B:
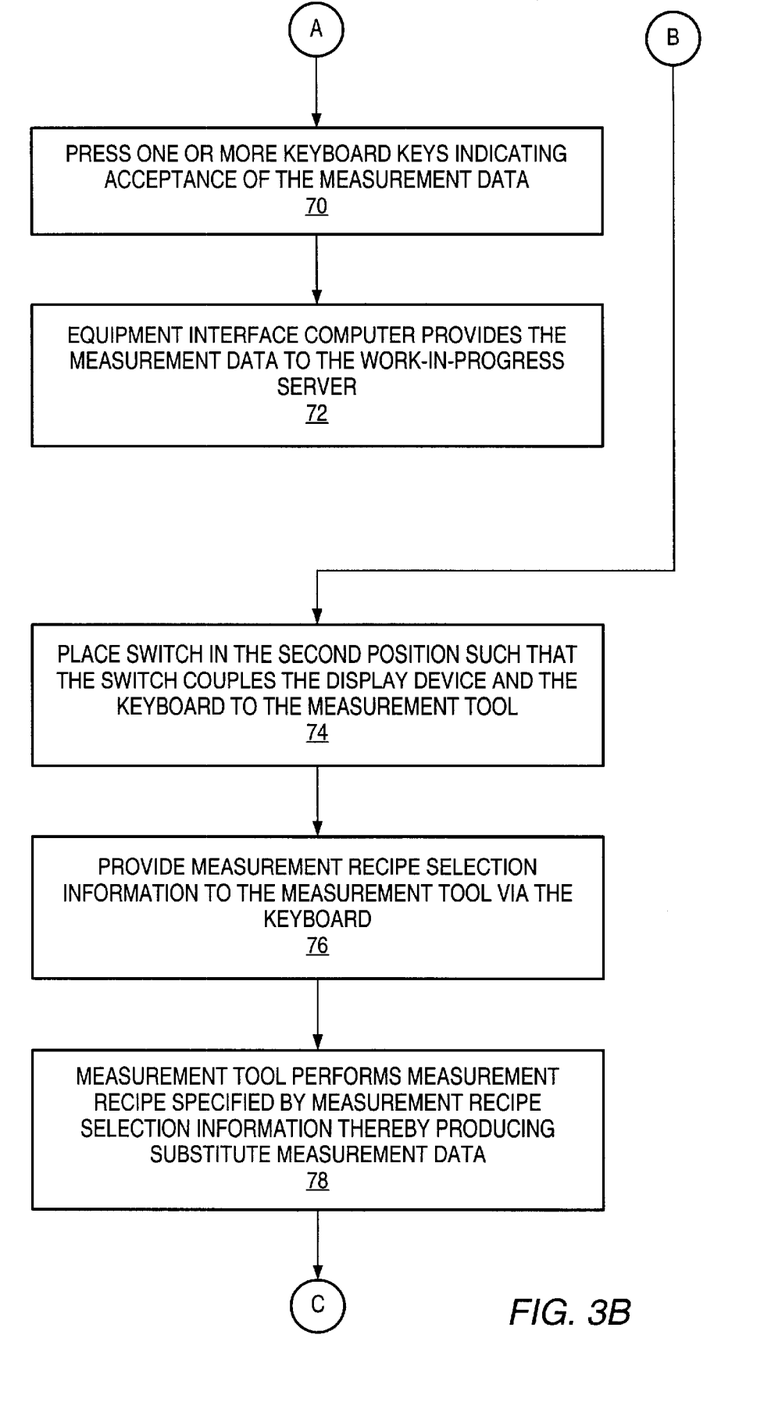
Figure 3C:
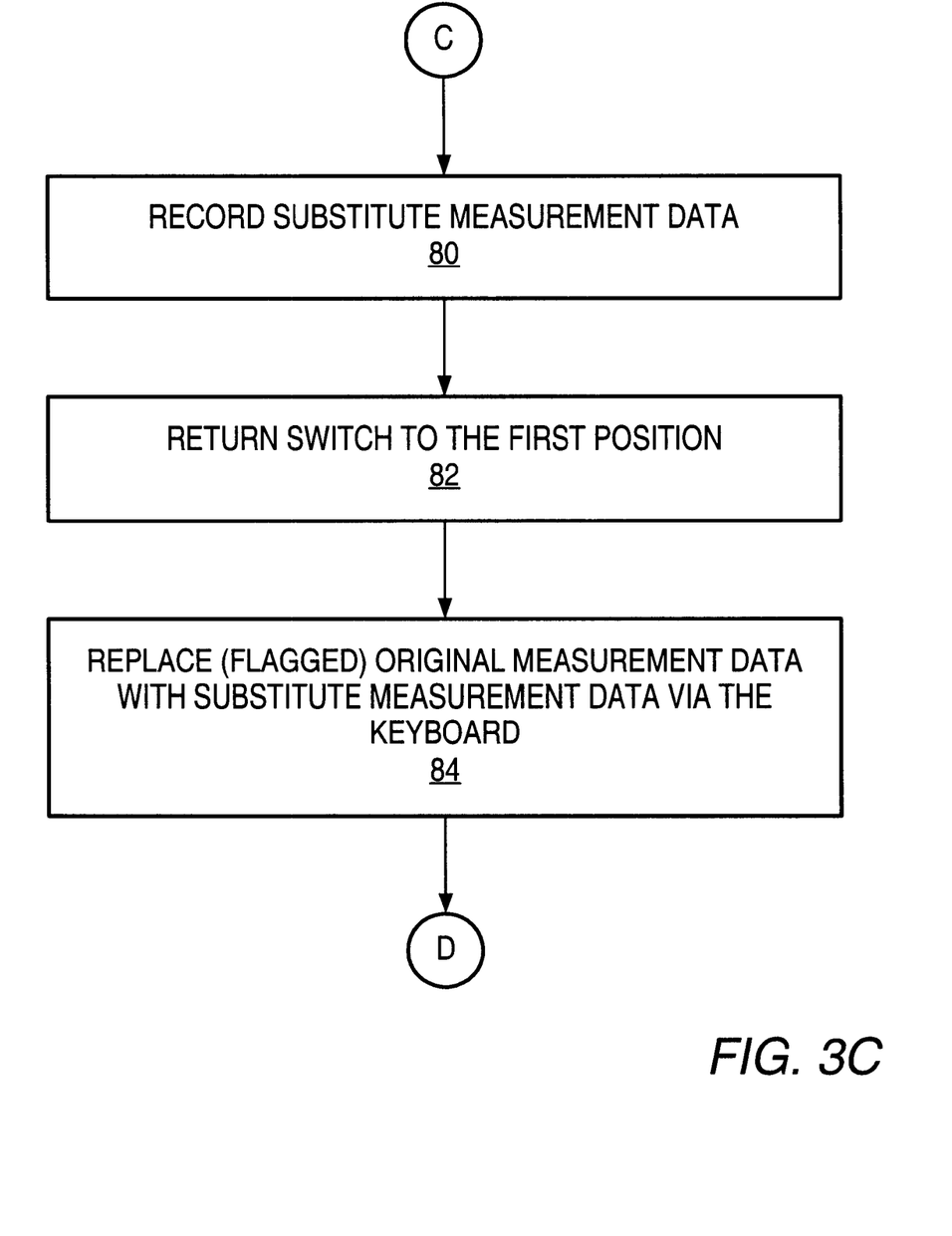

FIGS. 3a–c form a flow chart illustrating the exemplary data collection and dissemination method embodied within wafer fabrication system 30 and described above. In a step 60, the operator ensures that switch 42 (FIG. 2) is in the first position such that switch 42 couples display device 46 and keyboard 50 to equipment interface computer 44. Equipment interface computer 44 receives the measurement data produced by measurement tool 40 in a step 62. In a step 64, equipment interface computer 44 compares the measurement data to a predetermined range of acceptable values in order to determine if the measurement data is within the range of acceptable values. Equipment interface computer 44 displays the measurement data upon display device 46 such that any portion of the measurement data not within the range of acceptable values is visually flagged in a step 66. In a decision step 68, the operator determines if the displayed measurement data is acceptable.

If the displayed measurement data is acceptable, the operator may press one or more predetermined keys of keyboard 50 in a step 70. The pressing of the one or more predetermined keys may result in a signal indicating acceptance of the measurement data. In a step 72, equipment interface computer 44 may receive the signal indicating acceptance via switch 42 and respond by providing the measurement data to WIP server 38. Equipment interface computer 44 may also respond to the acceptance signal by providing the measurement data to entity server 54 and/or SPC server 56.

If the displayed measurement data is not acceptable (e.g., at least a portion of the measurement data is flagged), the operator may place switch 42 in the second position in a step 74. As described above, switch 42 couples display device 46 and keyboard 50 to measurement tool 40 in the second position. In a step 76, the operator may provide measurement recipe selection information to measurement tool 40 via keyboard 50. In response, measurement tool 40 may generate substitute measurement data by performing the measurement recipe specified by the measurement recipe selection information during a step 78. The operator may record the substitute measurement data during a step 80, and return switch 42 to the first position during a step 82. The operator may then replace selected (e.g., flagged) measurement data with substitute measurement data via keyboard 50. The resulting modified measurement data may then be processed as described above beginning with step 64.

Figure 4:
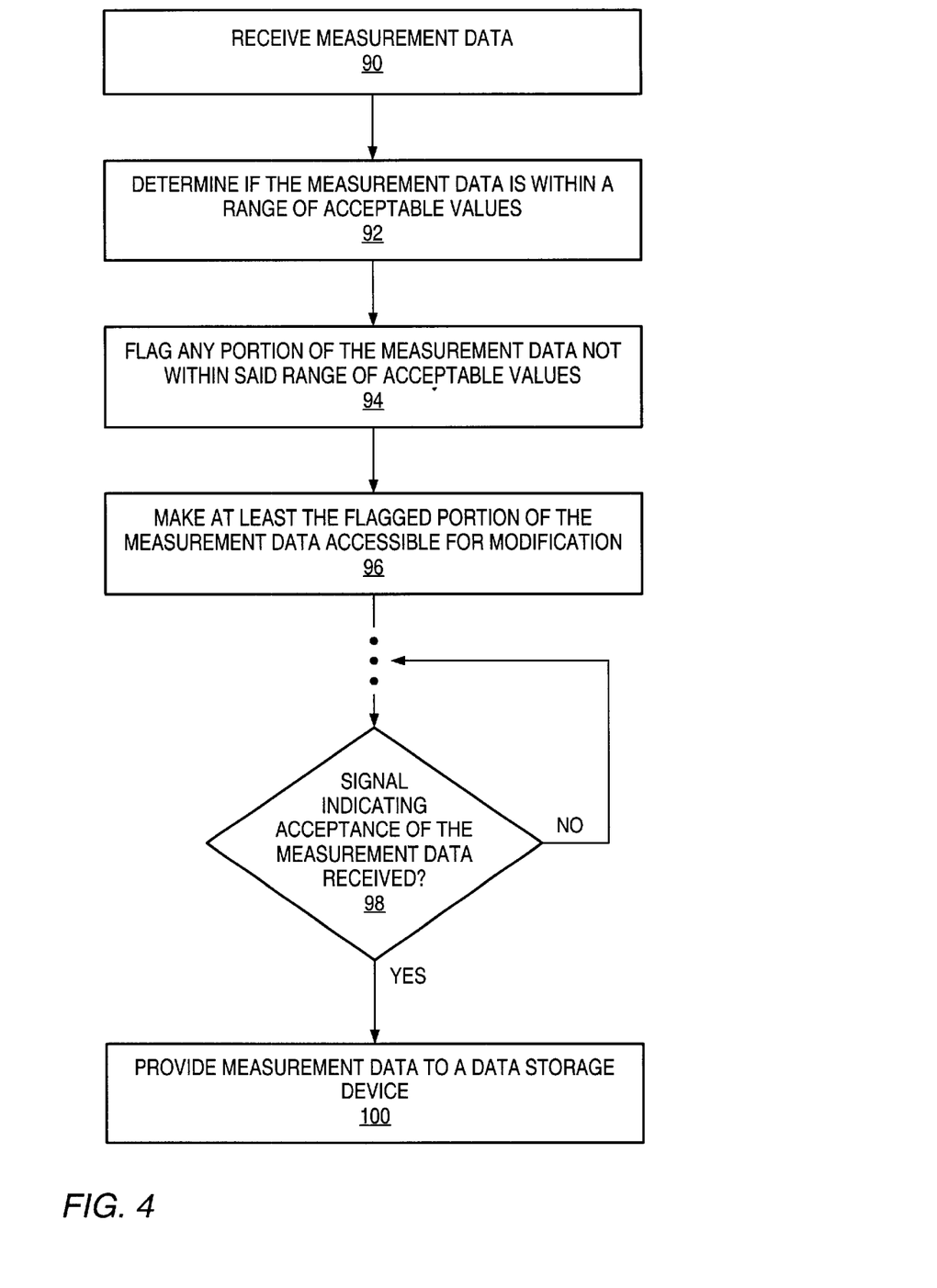
FIG. 4 is a flow chart illustrating a method for screening measurement data in accordance with the present invention.

FIG. 4 is a flow chart illustrating a method for screening measurement data in accordance with the present invention. In a step 90, measurement data is received. The measurement data is then examined to determine if the measurement data is within a range of acceptable values during a step 92. In a step 94, any portion of the measurement data not within the range of acceptable values is flagged. The flagged portion of the measurement data is made accessible for modification during a step 96. In a decision step 98, the presence of a signal indicating acceptance of the measurement data is ascertained. If the signal is received, the measurement data is provided to a data storage device during a step 100. If the signal indicating acceptance is not received during step 98, the measurement data may, for example, be modified and step 98 repeated. It is noted that step 100 is only performed after the signal indicating acceptance is received in step 98. As a result, out-of-range measurement data is prevented from being provided to the data storage device without review and acceptance.

It will be appreciated by those skilled in the art having the benefit of this disclosure that this invention is believed to be a wafer fabrication system including a measurement system which screens measurement data prior to dissemination. It is intended that the following claims be interpreted to embrace all such modifications and changes and, accordingly, the specification and drawings are to be regarded in an illustrative rather than a restrictive sense.

What is claimed is:

1. An apparatus for performing a measurement procedure upon a semiconductor wafer, comprising:

a measurement tool configurable to perform one of a plurality of measurement procedures upon said semiconductor wafer, thereby producing measurement data;

a work-in-process server for selecting the one of the plurality of measurement procedures and for storing corresponding said measurement data;

an equipment interface computer coupled between said measurement tool and said work-in-process server, wherein the equipment interface computer is configured to:

receive said measurement data produced by said measurement tool;

display said measurement data upon a display device; and provide the measurement data to the work-in-process server in response to a signal indicating acceptance of the measurement data.

2. The apparatus as recited in claim 1, wherein the equipment interface computer is further configured to:

determine if said measurement data is within a range of acceptable values; and display said measurement data upon the display device such that a portion of said measurement data not within said range of acceptable values is visually flagged.

3. The apparatus as recited in claim 2, wherein the equipment interface computer is further configured to make at least the portion of said measurement data not within said range of acceptable values accessible for modification.

4. The apparatus as recited in claim 3, further comprising a switch coupled between said measurement tool and said equipment interface computer, wherein said switch selectively couples said display device and a keyboard to either said measurement tool or said equipment interface computer.

5. The apparatus as recited in claim 4, wherein when said switch couples the display device and the keyboard to the equipment interface computer, the equipment interface computer receives substitute measurement data and said signal indicating acceptance from the keyboard, wherein said substitute measurement data replaces the measurement data produced by said measurement tool.

6. The apparatus as recited in claim 4, wherein when said switch couples the display device and the keyboard to the measurement tool, the measurement tool receives measurement procedure selection information from the keyboard, responds to said measurement procedure selection information by performing the one of the plurality of measurement procedures upon said semiconductor wafer, and provides the resulting measurement data to the display device.

7. The apparatus as recited in claim 4, further comprising:
a keyboard interface coupled between the keyboard and the switch;
a bar code reader coupled to said keyboard interface and configured to read a bar code thereby producing bar code information, and wherein said bar code information identifies said semiconductor wafer; and
wherein the keyboard interface couples both the keyboard and the bar code reader to the switch.

8. The apparatus as recited in claim 7, wherein when said switch couples the keyboard and the display device to the equipment interface computer, the equipment interface computer receives said bar code information via the keyboard interface and the switch.

9. The apparatus as recited in claim 8, wherein said equipment interface computer provides said bar code information to the work-in-process server, and wherein the work1 in-process server responds to said bar code information by providing measurement procedure selection information to said equipment interface computer, and wherein said measurement procedure selection information specifies the one of the plurality of measurement procedures to be performed by said measurement tool upon said semiconductor wafer.

10. The apparatus as recited in claim 9, wherein said equipment interface computer provides said measurement procedure selection information to said measurement tool, and wherein said measurement tool responds to said measurement procedure selection information by performing the one of the plurality of measurement procedures upon said semiconductor wafer.

11. An apparatus for performing a process upon a semiconductor wafer, comprising:
a transmission medium;
a work-in-process server coupled to said transmission medium and configured to schedule said process and to store measurement data;
a process tool coupled to said transmission medium and configured to perform said process upon the semiconductor wafer;
a measurement tool configurable to perform one of a plurality of measurement procedures upon said semiconductor wafer, thereby producing measurement data;
an equipment interface computer coupled between said transmission medium and said measurement tool, wherein the equipment interface computer is configured to:
receive said measurement data produced by said measurement tool;
display said measurement data upon a display device; and
provide the measurement data to the work-in-process server in response to a signal indicating acceptance of the measurement data.

12. The apparatus as recited in claim 11, wherein the equipment interface computer is further configured to:
determine if said measurement data is within a range of acceptable values; and
display said measurement data upon the display device such that a portion of said measurement data not within said range of acceptable values is visually flagged.

13. The apparatus as recited in claim 12, wherein the equipment interface computer is further configured to make at least the portion of said measurement data not within said range of acceptable values accessible for modification.

14. The apparatus as recited in claim 13, further comprising a switch coupled between said measurement tool and said equipment interface computer, wherein said switch selectively couples said display device and a keyboard to either said measurement tool or said equipment interface computer.

15. The apparatus as recited in claim 14, wherein when said switch couples the display device and the keyboard to the equipment interface computer, the equipment interface computer receives substitute measurement data and said signal indicating acceptance from the keyboard, wherein said substitute measurement data replaces the measurement data produced by said measurement tool.

16. The apparatus as recited in claim 14, wherein when said switch couples the display device and the keyboard to the measurement tool, the measurement tool receives measurement procedure selection information from the keyboard, responds to said measurement procedure selection information by performing the one of the plurality of measurement procedures upon said semiconductor wafer, and provides the resulting measurement data to the display device.

17. A method for screening measurement data, comprising:
receiving said measurement data;
determining if said measurement data is within a range of acceptable values;
flagging a portion of said measurement data not within said range of acceptable values;
making at least the portion of said measurement data not within said range of acceptable values accessible for modification; and
providing said measurement data to a data storage device in response to a signal indicating acceptance of the measurement data.

18. The method of claim 17, wherein said range of acceptable values is determined by statistical analysis of historical measurement data.

19. The method of claim 17, wherein said determining comprises comparing the measurement data to said range of acceptable values with the equipment interface computer.

* * * * *

UNITED STATES PATENT AND TRADEMARK OFFICE
CERTIFICATE OF CORRECTION

PATENT NO.    : 6,446,022 B1
DATED         : September 3, 2002
INVENTOR(S)   : Coss Jr. et al.

It is certified that error appears in the above-identified patent and that said Letters Patent is hereby corrected as shown below:

<u>Title page,</u>
Item [75], Inventors, delete inventor "Mike Simpson" and substitute therefor
-- Michael B. Simpson --.

<u>Column 9,</u>
Lines 40-41, after the phrase "and wherein the" delete "work1in-process" and substitute therefor -- work-in-process --.

<u>Column 10,</u>
Line 50, after the phrase "acceptable values," insert -- wherein said determining is performed by a computer --.
Lines 62-64, should read -- The method of claim 17, wherein said computer comprises an equipment interface computer --.

Signed and Sealed this

Fourteenth Day of October, 2003

JAMES E. ROGAN
*Director of the United States Patent and Trademark Office*